(12) United States Patent
Shimada

(10) Patent No.: US 12,576,574 B2
(45) Date of Patent: *Mar. 17, 2026

(54) RESIN CONTAINER MANUFACTURING METHOD

(71) Applicant: NISSEI ASB MACHINE CO., LTD., Nagano (JP)

(72) Inventor: Kiyonori Shimada, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 78 days.

This patent is subject to a terminal disclaimer.

(21) Appl. No.: 18/604,970

(22) Filed: Mar. 14, 2024

(65) Prior Publication Data

US 2024/0217158 A1      Jul. 4, 2024

Related U.S. Application Data

(63) Continuation of application No. 17/602,125, filed as application No. PCT/JP2020/015875 on Apr. 8, 2020, now Pat. No. 11,958,229.

(30) Foreign Application Priority Data

Apr. 9, 2019      (JP) ................................. 2019-074339
Oct. 15, 2019     (JP) ................................. 2019-188812

(51) Int. Cl.
  *B29C 49/06* (2006.01)
  *B29C 49/00* (2006.01)
  (Continued)

(52) U.S. Cl.
  CPC .......... *B29C 49/0665* (2022.05); *B29C 49/06* (2013.01); *B29C 49/12* (2013.01);
  (Continued)

(58) Field of Classification Search
  None
  See application file for complete search history.

(56) References Cited

U.S. PATENT DOCUMENTS

| | | | |
|---|---|---|---|
| 4,025,594 A | 5/1977 | Agrawal | |
| 11,958,229 B2 * | 4/2024 | Shimada | ................. B29C 49/06 |

(Continued)

FOREIGN PATENT DOCUMENTS

| | | |
|---|---|---|
| DE | 102007037536 A1 | 5/2008 |
| EP | 2 595 792 B1 | 3/2014 |

(Continued)

OTHER PUBLICATIONS

International Search Report issued in International Patent Application No. PCT/JP2020/015875, dated Jun. 30, 2020, along with English translation thereof.

(Continued)

*Primary Examiner* — JaMel M Nelson
*Assistant Examiner* — Virak Nguon
(74) *Attorney, Agent, or Firm* — Greenblum & Bernstein, P.L.C.

(57) ABSTRACT

The present application includes an injection molding step and a stretch blow molding step. The stretch blow molding step is configured to include: a first step in which preliminary blow air is introduced into a preform to stretch the preform in a state in which a stretching rod does not contact the bottom of the preform; a second step which is executed after the first step, and in which the preliminary blow air is introduced into the preform and the stretching rod is moved at a set speed and pressed against the bottom of the preform to stretch the preform; and a third step which is executed after the second step, and in which final blow air is introduced into the preform to stretch the preform.

5 Claims, 6 Drawing Sheets

INJECTION MOLDING
STEP

FIRST CONVEYING
STEP

(51) Int. Cl.
| | |
|---|---|
| *B29C 49/12* | (2006.01) |
| *B29C 49/16* | (2006.01) |
| *B29C 49/18* | (2006.01) |
| *B29D 22/00* | (2006.01) |

(52) U.S. Cl.
CPC ............. *B29C 49/16* (2013.01); *B29C 49/18* (2013.01); *B29D 22/003* (2013.01); *B29C 49/0005* (2013.01); *B29K 2023/06* (2013.01)

(56)                References Cited

U.S. PATENT DOCUMENTS

| | | |
|---|---|---|
| 2006/0068048 A1 | 3/2006 | Koda et al. |
| 2010/0013129 A1 | 1/2010 | Duranel et al. |
| 2010/0068437 A1* | 3/2010 | Duranel .................. B29C 49/12 |
| | | 264/572 |
| 2010/0080944 A1 | 4/2010 | Etesse |
| 2011/0180405 A1 | 7/2011 | Chinnayelka et al. |
| 2011/0206882 A1 | 8/2011 | Broyles et al. |
| 2011/0217500 A1 | 9/2011 | Gottschalk et al. |
| 2013/0113143 A1 | 5/2013 | Fevre et al. |
| 2016/0029935 A1 | 2/2016 | Chinnayelka et al. |

FOREIGN PATENT DOCUMENTS

| | | |
|---|---|---|
| JP | 05185493 A | 7/1993 |
| JP | 6-278195 A | 10/1994 |
| JP | H06-344427 | 12/1994 |
| JP | 2004-188866 A | 7/2004 |
| JP | 2004-001314 A | 1/2008 |
| JP | 2009-541084 A | 11/2009 |
| JP | 2012-503564 A | 2/2012 |
| JP | 2012-506329 A | 3/2012 |
| JP | 2013-520334 A | 6/2013 |
| JP | 5261703 B2 | 8/2013 |

OTHER PUBLICATIONS

Written Opinion (PCT/ISA/237) issued in International Patent Application No. PCT/JP2020/015875, dated Jun. 30, 2020, along with English translation thereof.
Extended European Search Report issued in family member European application No. 20788112.9 on Mar. 15, 2023.
Partial Supplementary European Search Report issued to European Patent Application No. 20788112.9 dated Dec. 1, 2022.

* cited by examiner

INJECTION MOLDING STEP    FIRST CONVEYING STEP    TEMPERATURE ADJUSTMENT STEP    SECOND CONVEYING STEP

FIRST STEP     SECOND STEP     THIRD STEP

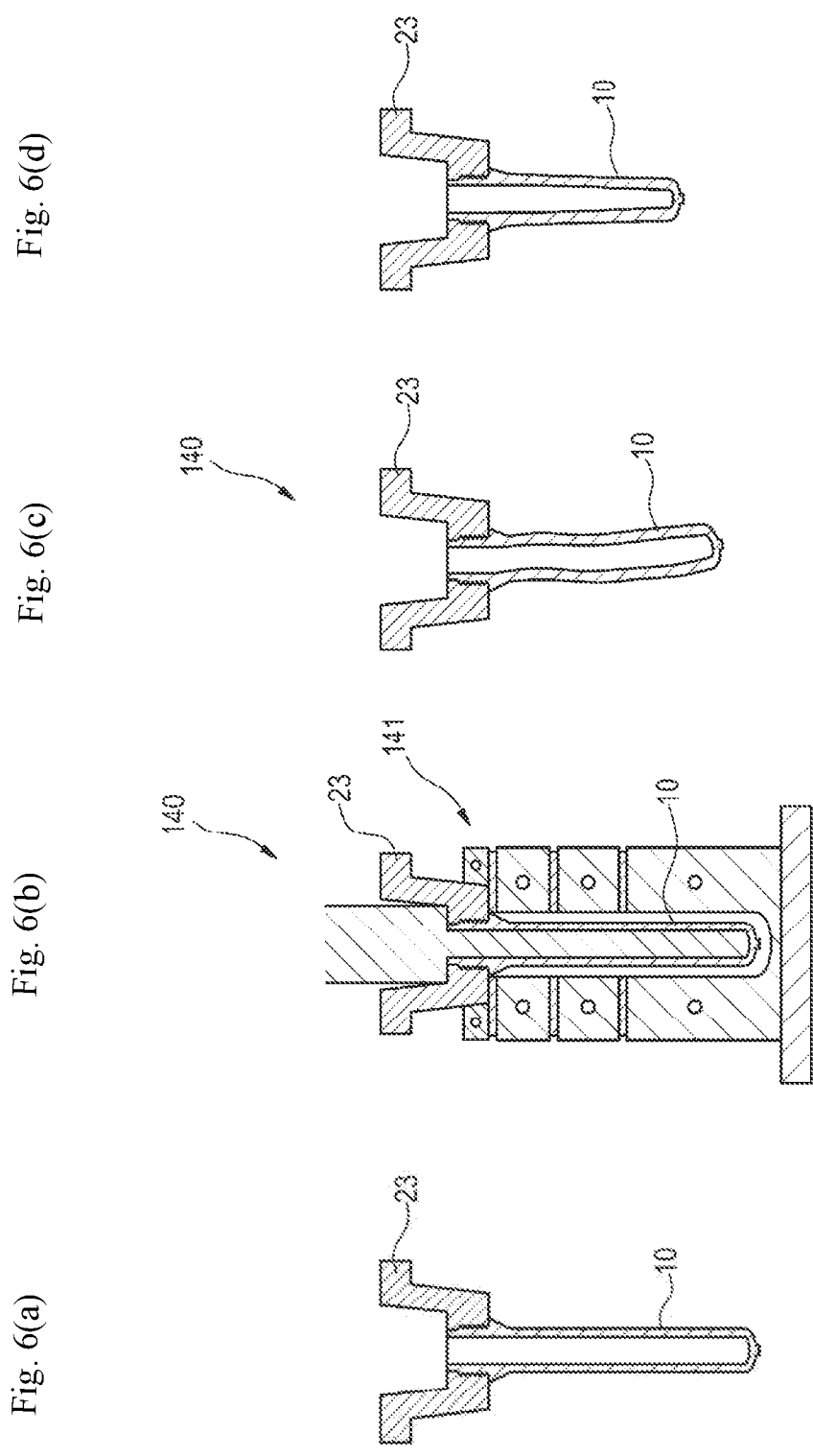

RESIN CONTAINER MANUFACTURING METHOD

This application is a continuation of U.S. application Ser. No. 17/602,125 filed on Oct. 7, 2021, which is a National Stage Entry of International Appl. No. PCT/JP2020/015875, filed Apr. 8, 2020, which claims the benefit of priority to Japanese Patent Application No. 2019-074339 filed on Apr. 9, 2019 and to Japanese Patent Application No. 2019-188812 filed on Oct. 15, 2019. The entire contents of each of these applications are hereby incorporated herein by reference.

TECHNICAL FIELD

The present invention relates to a manufacturing method for manufacturing a resin container (bottle) made of polyethylene using a so-called injection stretch blow molding (ISBM) method.

BACKGROUND ART

Conventionally, as one of resin containers for containing various liquids therein, a polyethylene container is known. Polyethylene (PE), in particular high-density polyethylene (HDPE), is excellent in chemical resistance, waterproofness, impact resistance and insulation properties. Therefore, the polyethylene container is suitable for containing, for example, drugs, bleach, milk, kerosene, or the like.

As manufacturing methods for manufacturing resin containers, for example, a method called a direct blow molding method, in which blow air is blown into a cylindrical parison to shape the parison, or a method called an injection stretch blow molding (ISBM) process, in which a bottomed cylindrical preform formed by injection molding is shaped by stretching the preform by a stretching rod while blowing blow air therein, is known (see Patent Literatures 1 and 2).

CITATION LIST

Patent Literature

Patent Literature 1: JP-A-2004-1314
Patent Literature 2: JP-A-2004-188866

SUMMARY OF INVENTION

Technical Problem

As compared with the direct blow molding method, the injection stretch blow molding method has advantages that it is possible to manufacture a container which has a higher dimensional accuracy and has physical properties improved due to a biaxial stretching effect by the stretching rod and the blow air.

However, resin containers made of polyethylene (PE) could be molded by the injection stretch blow molding method only for relatively small sized ones. That is, resin containers made of polyethylene have been mainly molded by the direct blow molding method for the reasons of the material properties described below.

Polyethylene (PE) has a property (physical property) that it is relatively soft. For example, polyethylene is a soft material as compared with polyethylene terephthalate (PET), polypropylene (PP), and the like. Therefore, unlike PET and the like, PE does not have a strain fixing property, and there is a problem that it is difficult to adjust a thickness thereof by stretching with a rod.

Herein, the strain fixing property means a property that after the weakest portion (usually the hottest portion) of the preform first reaches a yield point, strength of a preform is increased by orientation during a stretching process, until the next weakest portion reaches a level of strength at which the next weakest portion starts to be stretched. This procedure is repeated until each portion of the preform has been stretched by substantially the same amount. Therefore, in a case of a PET preform, if a shape or temperature thereof is appropriately adjusted, it is easy to shape a container having a substantially uniform thickness and to obtain a container having an increased strength by a stretch orientation effect.

On the contrary, in a case of a PE preform, there is no strain fixing property as described above. Accordingly, it is difficult to adjust a thickness of a container by stretching with a rod. Also, it is difficult to obtain a PE container having sufficient and appropriate strength, rigidity and appearance. In addition, PE has a property that a crystallization speed is faster than that of PET, PP, and the like. Accordingly, a preform formed by injection molding is easily solidified. Therefore, there is a problem that it is difficult to appropriately inflate the PE preform by stretch blow molding.

For example, in order to appropriately inflate a PE preform, it is necessary to raise a temperature of the preform to a temperature close to a melting point thereof during stretch blow molding. This makes it difficult to control the temperature. Further, since the PE preform in a high temperature state is very soft, there is also a problem that puncture or rupture easily occurs due to the contact of the stretching rod therewith or a pressure of the blow air. In particular, if a small-mouthed PE container is blow-molded, it is necessary to use a stretching rod having a small diameter suitable for the small-mouthed container. Accordingly, defects, such as puncture or rupture as described above, are more likely to occur.

Further, PE has a property that a thermal shrinkage rate thereof is also larger than that of PET, PP, and the like. Therefore, the PE preform formed by injection molding is subject to significant shrinkage and deformation before stretch blow molding. Accordingly, it is difficult to appropriately adjust an amount of lowering of the stretching rod and an amount of the blow air to be introduced in consideration of an amount of deformation of the preform.

Further in the case of PE, a temperature range suitable for blow molding is very narrow and also an allowable range of longitudinal and transverse stretch ratios is narrow.

For these reasons, the present situation is that the resin containers made of polyethylene is mainly molded by the direct blow molding method.

The present invention has been made in view of the above problems and an object thereof is to provide a manufacturing method for manufacturing a resin container, in which it is possible to satisfactorily form a resin container made of polyethylene using the injection stretch blow molding method.

Solution to Problem

One aspect of the present invention solving the above object is a manufacturing method for manufacturing a resin container made of polyethylene using an injection stretch blow molding method, the manufacturing method including:

an injection molding step of forming a bottomed preform by injection molding; and a stretch blow molding step of stretching the preform by pressing a bottom portion of the preform using a stretching rod while introducing blow air into the preform, wherein the stretch blow molding step includes a first step of stretching the preform by introducing preliminary blow air which has a pressure lower than final blow air into the preform in a state where the stretching rod is not in contact with the bottom portion of the preform;

a second step of stretching the preform by moving the stretching rod at a predetermined set speed and pressing the bottom portion of the preform by the stretching rod while introducing the preliminary blow air into the preform, the second step being performed after the first step; and a third step of stretching the preform by introducing the final blow air into the preform, the third step being performed after the second step Also, another aspect of the present invention solving the above object is a manufacturing method for manufacturing a resin container made of polyethylene using an injection stretch blow molding method, the manufacturing method including:

an injection molding step of forming a bottomed preform by injection molding;

a temperature adjustment step of adjusting a temperature of the preform; and a stretch blow molding step of stretching the preform by pressing a bottom portion of the preform using a stretching rod while introducing blow air into the preform, wherein during the temperature adjustment step, a temperature equalization treatment is performed by shrinking the preform in a longitudinal axis direction thereof, wherein during the temperature equalization treatment, the preform is deformed in a direction intersecting the longitudinal axis direction.

Advantageous Effects of Invention

According to the present invention, it is possible to satisfactorily form a resin container made of polyethylene (PE) using the injection stretch blow molding method.

BRIEF DESCRIPTION OF DRAWINGS

FIG. 6(a), FIG. 6(b), FIG. 6(c), and FIG. 6(d) are schematic views explaining a manufacturing method for a resin container according to an embodiment of the present invention.

DESCRIPTION OF EMBODIMENTS

Hereinafter, embodiments of the present invention will be described in detail with reference to the drawings.

First, an example of a shape of a hollow container (resin container) manufactured by a manufacturing method for manufacturing a resin container according to the present embodiment will be described.

Figure 1:
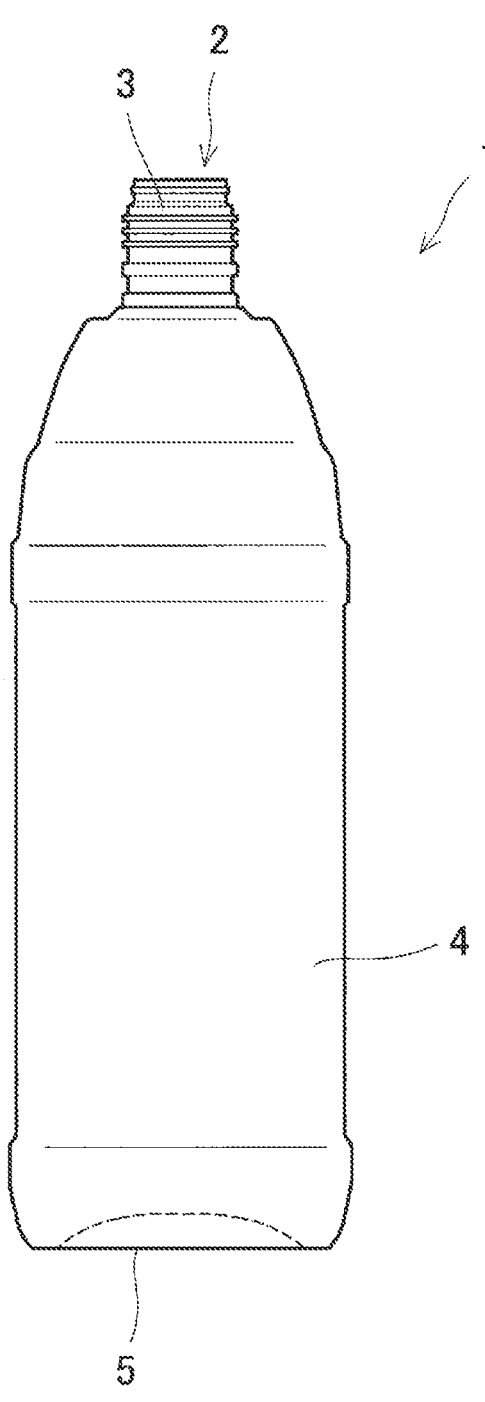
FIG. 1 is a view showing an example of a resin container manufactured by a manufacturing method according to the present invention.

As shown in FIG. 1, the hollow container 1 includes a tubular neck portion 3 having an opening 2 on one end side thereof (upper end side); a tubular body portion 4 connected to the neck portion 3; and a bottom portion 5 continuous from the body portion 4. The hollow container (resin container) 1 is made of a relatively soft resin material, specifically polyethylene (PE), preferably high-density polyethylene (HDPE), and is excellent in chemical resistance, waterproofness, impact resistance and insulation properties. The hollow container 1 is suitable to be filled with, for example, drugs, bleach, milk, kerosene, or the like as contents.

The hollow container 1 is formed by injection-molding a bottomed preform as an intermediate molded product and then stretch blow-molding the preform. That is, the hollow container 1 is formed by the injection stretch blow molding (ISBM) method. Although it is sufficient if the material of the hollow container 1 (the material of the preform) is polyethylene, it is preferable to employ polyethylene having a melt flow rate (MFR) of 0.3 to 4.0 g/10 min, more preferably 0.3 to 2.0 g/10 min, further more preferably 0.3 to 1.0 g/10 min.

Figure 2:
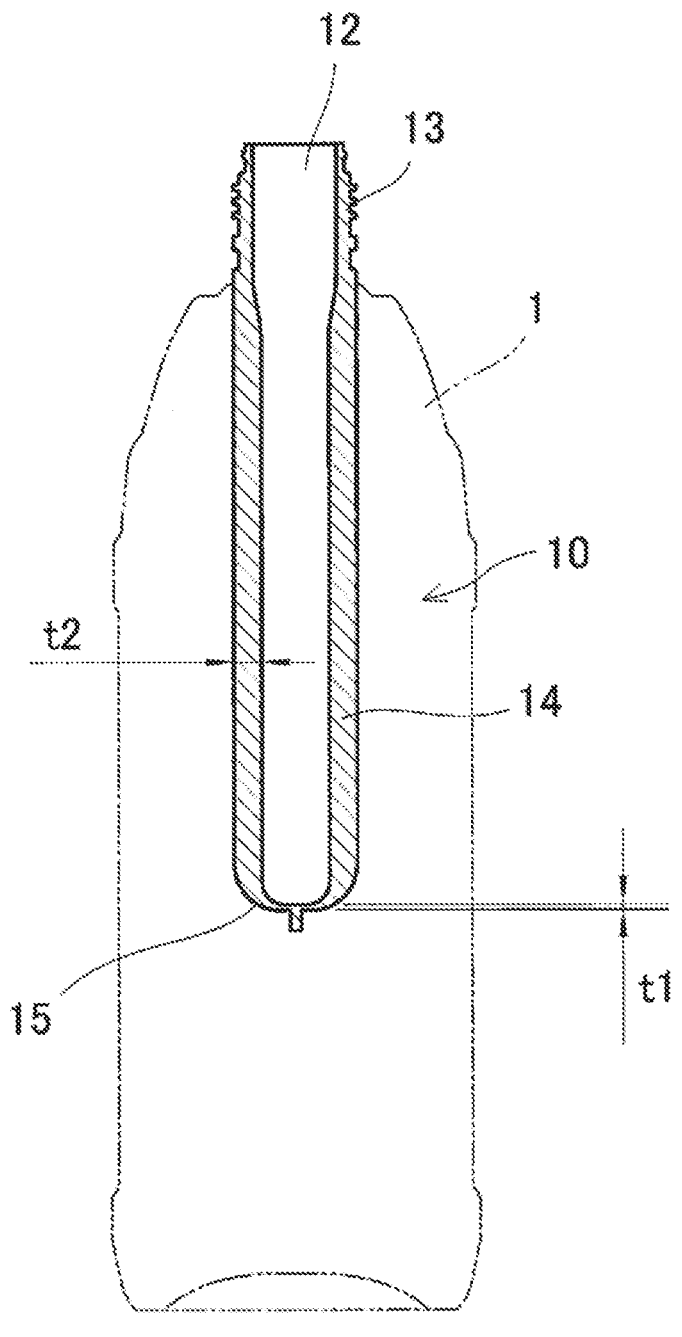
FIG. 2 is a view showing an example of a preform for molding a resin container.

As shown in FIG. 2, the preform 10 for forming the hollow container 1 includes a neck portion 13 having an opening 12 on one end side (upper end side), a body portion 14 continuous from the neck portion 13, and a bottom portion 15 continuous from the body portion 14.

The neck portion 13 is formed in substantially the same shape as the neck portion 3 of the hollow container 1. Also, the bottom portion 15 of the preform 10 is preferably formed to be thinner than the body portion 14. For example, a thickness t1 of the bottom portion 15 of the preform 10 is preferably ¼ or less of a thickness t2 of the body portion 14. Further, a length of the body portion 14 of the preform 10 is preferably ⅘ or less of a length of the body portion 4 of the hollow container 1, in particular ½ to ¾ of the length of the body portion 4 of the hollow container 1.

In the following a manufacturing method for manufacturing the hollow container (resin container) 1 will be described. First, a schematic configuration of an injection stretch blow molding apparatus which is a manufacturing apparatus for manufacturing the hollow container 1 will be described.

Figure 3:
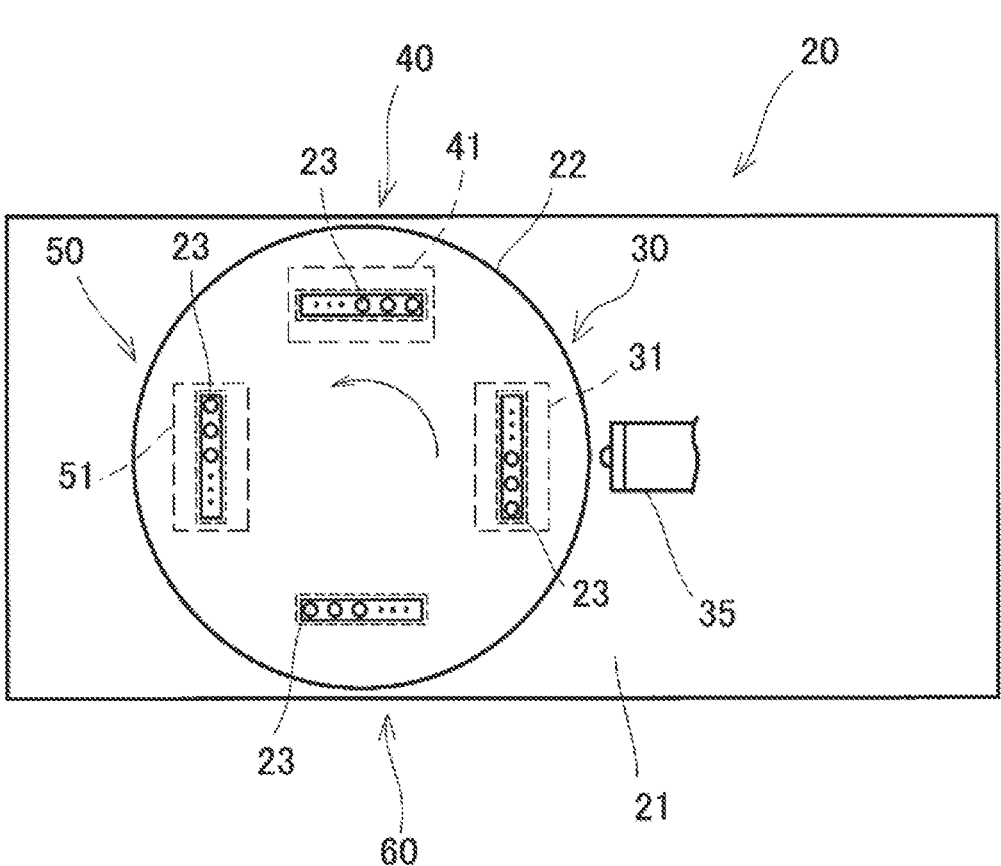
FIG. 3 is a view showing a schematic configuration of a manufacturing apparatus for a resin container according to an embodiment of the present invention.

As shown in FIG. 3, the injection stretch blow molding apparatus 20 is a so-called hot parison type (one-step type) apparatus and has, on a machine base 21, an injection molding part (injection molding device) 30, a temperature adjustment part (temperature adjustment device) 40, a stretch blow molding part (stretch blow molding device) 50, and a take-out part (take-out device) 60.

Also, a rotation plate 22 is provided above the injection molding part 30, the temperature adjustment part 40, the stretch blow molding part 50, and the take-out part 60. The rotation plate 22 is configured to intermittently rotate relative to the machine base 21, for example, counterclockwise as viewed from above. A neck mold (lip mold) 23 is provided at four positions on the rotation plate 22 along a circumferential direction. Accordingly, the preform 10 and the hollow container 1 can be sequentially conveyed to a predetermined device by intermittent rotation of the rotation plate 22 while being held by the neck mold 23.

Figures 4A, 4B, 4C, 4D:
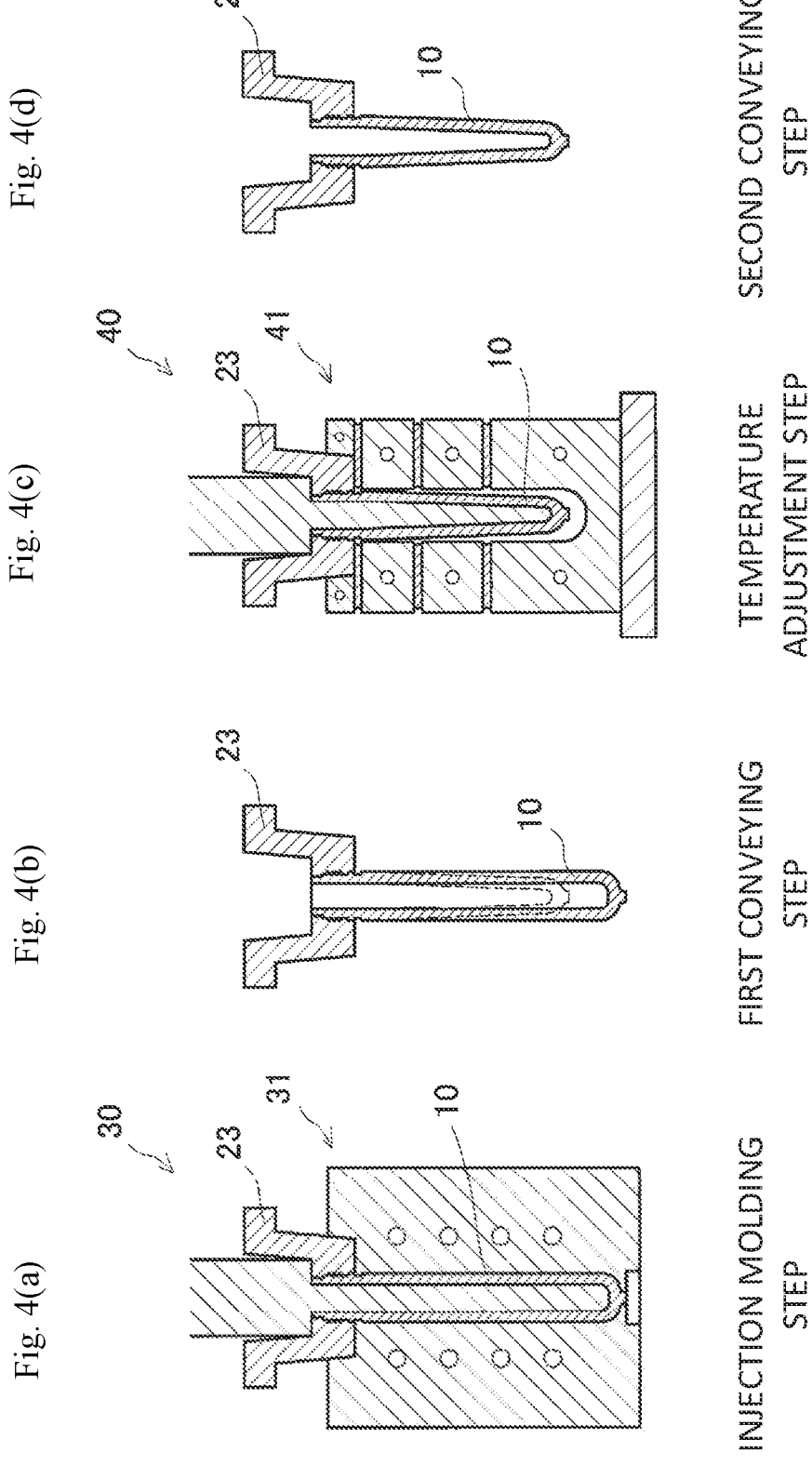
FIG. 4(a), FIG. 4(b), FIG. 4(c), and FIG. 4(d) are schematic views explaining a manufacturing method for a resin container according to an embodiment of the present invention.

As shown in FIG. 4, the injection molding part 30 is configured to allow a molten resin material (polyethylene or the like) injected from an injection unit (injection device) 35 to be introduced into a space of an injection molding mold 31 defining an outer shape of the preform, thereby molding a preform 10 having a shape as described above (injection molding step). The injection-molded preform 10 is released from the injection molding mold 31 and then conveyed to the temperature adjustment part 40 (first conveying step). The temperature adjustment part 40 is configured to perform a temperature adjustment treatment to the injection-molded preform 10 using a temperature adjustment mold 41, thereby adjusting a temperature of the preform 10 to an appropriate temperature (temperature adjustment step). The temperature-adjusted preform 10 is conveyed to the stretch blow molding part 50 (second conveying step).

While the preform 10 is conveyed from the injection molding part 30 to the stretch blow molding part 50, the preform 10 is temperature-adjusted (cooled) and shrunk to a predetermined size. In other words, the temperature adjustment (cooling) for the preform 10 is performed between the injection molding part 30 and the stretch blow molding part 50 such that when being brought into the stretch blow molding part 50, the preform 10 has a size shrunk to the predetermined size.

Specifically, the temperature adjustment is performed such that a length in a longitudinal axis direction of the preform 10 at the time of being brought into the stretch blow molding part 50 via the first conveying step, the temperature adjustment step, and the second conveying step is considerably shrunk by at least 8% or more, more preferably by about 10% to 20%, of a length in the longitudinal axis direction of the preform 10 at the time of being injection-molded in the injection molding part 30. Due to such a shrinkage phenomenon, temperature equalization of the preform 10 progresses and thus an effect that a temperature variation therein is eliminated is achieved, thereby enhancing formability.

Also, the injection molding step includes a filling step of introducing a molten resin material into the space, which is formed in the injection molding mold (including an injection core mold and an injection cavity mold) 31, defining the outer shape of the preform 10 (including an injection step and a pressure maintaining step), and a cooling step of cooling the introduced resin material inside the injection molding mold 31. The injection molding mold 31 is supplied with a cooling medium (temperature adjustment medium) and a temperature of the injection molding mold 31 is set to 10 to 100° C., preferably 50 to 65° C. It is preferable that a temperature of the injection core mold is set lower than a temperature of the injection cavity mold by setting a temperature of the injection core mold to 10 to 65° C. (preferably 10 to 30° C.) and a temperature of the injection cavity mold to 50 to 100° C. (preferably 60 to 90° C.).

In a case where the resin material is polyethylene, if the preform 10 is not maintained at a high temperature (for example, 130° C.) close to a melting point (for example, 150° C.) until stretch blow molding is performed, solidification by crystallization is promoted, and the preform 10 cannot be properly inflated. Therefore, in the injection molding step, it is preferable that an inside layer (core layer) of the preform 10 is formed to be thicker and an outer surface-side layer (skin layer) of the preform 10 is formed to be thinner, thereby ensuring that the preform 10 has a higher residual heat. In order to realize this state, it is preferable to shorten a duration of cooling; for example, it is preferable to set a duration of the cooling step to ⅖ or less of a duration of the filling step.

Also, the temperature adjustment step is preferably performed such that the shrinkage phenomenon of the preform 10 is almost ended by the temperature adjustment mold 41 (a heating pot mold which is not in contact with the preform 10 and a heating rod mold which is not in contact with the preform 10 (or a temperature adjustment rod mold which is in contact with the preform 10)), and the second conveying step is preferably performed such that the preform 10 which hardly shrinks can be conveyed to the blow molding mold 51. As a result, it is possible to appropriately adjust a position of a stretching rod during stretch blow molding, thereby avoiding puncture or rupture of the bottom portion 15 of the preform 10 due to inadvertent contact of the stretching rod therewith during stretch blow molding. Therefore, in the temperature adjustment step, it is preferable that decrease in temperature of the preform 10 is reduced by radiant heat from the heating pot, and it is preferable that the temperature adjustment rod, which has a length considering an amount of shrinkage of the preform 10 during the first conveying step and the temperature adjustment step, is inserted into the preform 10 to adjust the temperature of the preform 10. The heating pot mold and the heating rod mold is set to a temperature of, for example, 200 to 250° C. and heats the preform 10 from inside and outside by radiant heat. The temperature adjustment rod mold is appropriately set in a range of, for example, 60 to 100° C.

Also, in the stretch blow molding part (stretch blow molding device) 50, the preform 10 brought therein at an appropriate stretching temperature is received in the blow molding mold (a pair of blow split molds and one bottom mold) and is stretched (inflated) in the longitudinal axis direction by a rod and in a transversal axis direction by a high pressure fluid (blow air). That is, by stretch-blow-molding the preform 10, the hollow container 1 which is a final molded product is formed (stretch blow molding step). The blow molding mold is supplied therein with a cooling medium, and a temperature of the blow molding mold is set to 5 to 30° C. The hollow container 1 formed as described above is conveyed to the take-out part 60 and then is taken out from the take-out part 60 to the outside (take-out step).

Also, the present embodiment is characterized in the manufacturing method for manufacturing the hollow container (resin container) 1 using the injection stretch blow molding apparatus 20 as described above, in particular, in the stretch blow molding step performed in the stretch blow molding part (stretch blow molding device) 50.

Figures 5A, 5B, 5C:
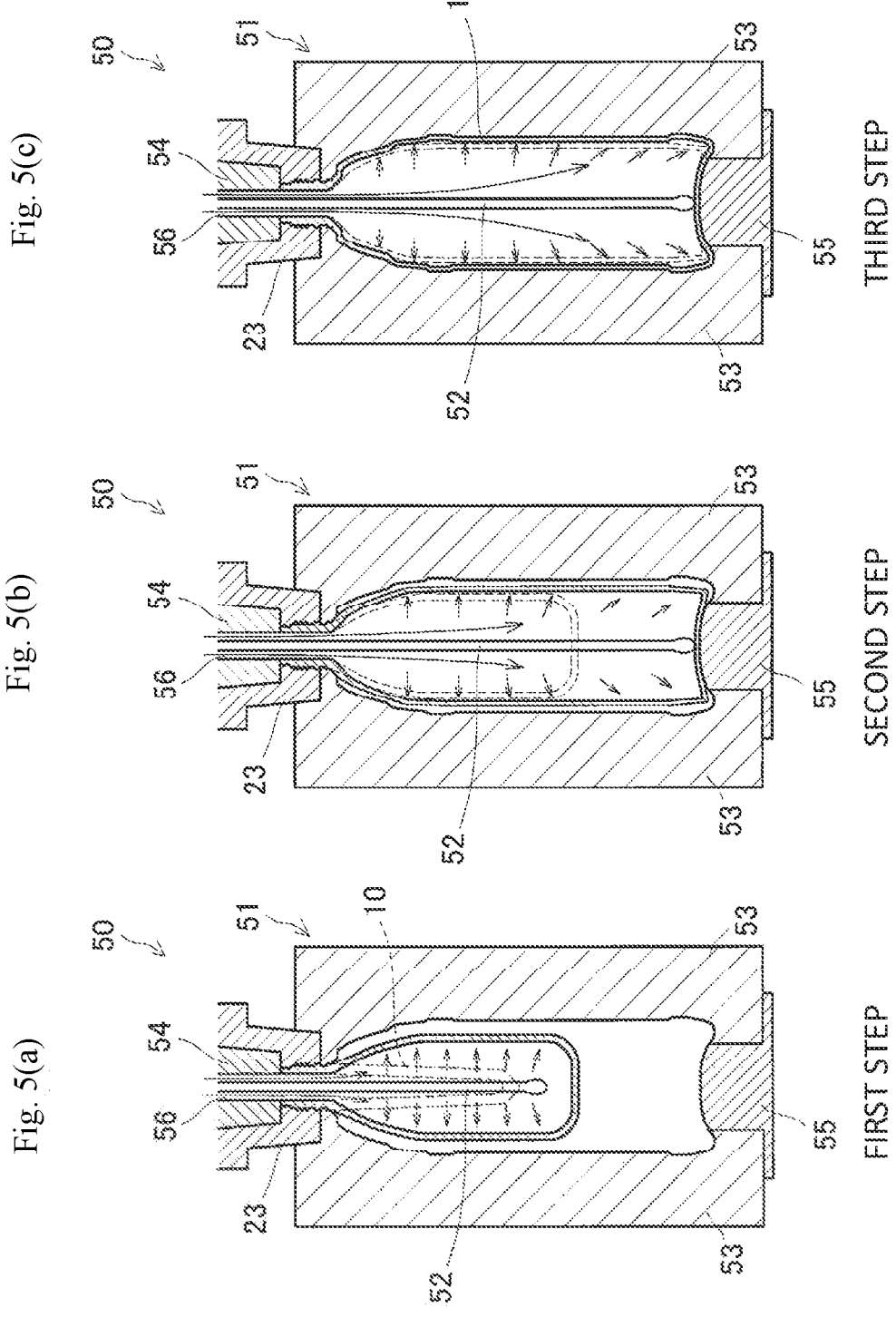
FIG. 5(a), FIG. 5(b), and FIG. 5(c) are schematic views explaining a manufacturing method for a resin container according to an embodiment of the present invention.

In the following, the stretch blow molding method in the manufacturing method for manufacturing the hollow container (resin container) 1 will be described in detail with reference to FIG. 5.

In the stretch blow molding part 50, the hollow container (resin container) 1 is formed by stretch-blow-molding the preform 10. As shown in FIG. 5, the stretch blow molding part 50 includes a blow molding mold 51 and a stretching rod 52. The blow molding mold 51 includes an openable blow molding split mold 53, a blow core mold 54, and a blow bottom mold 55. The blow core mold 54 has an insertion hole 56 through which the stretching rod 52 is inserted to be movable in a vertical direction. Also, although not shown, the stretch blow molding part 50 includes a supply unit for supplying a pressurized gas through the insertion hole 56 of the blow core mold 54.

In the stretch blow molding part 50, the preform 10 disposed in the blow molding mold 51 is stretched in the longitudinal axis direction by the stretching rod 52 and also stretched in a radial direction by the pressurized gas (blow air) supplied from the supply unit until the preform 10 comes into contact with an inner wall surface of the blow molding mold 51. As a result, the hollow container (resin container) 1 which is a final molded product is formed.

Specifically, the stretch blow molding step performed in the stretch blow molding part 50 includes first to third steps.

In the first step, blow air (preliminary blow air) having a pressure (for example, 1.5 MPa or less) lower than a predetermined set pressure Pa (for example, 2.5 to 3.5 MPa) of final blow air (blow air for strongly pressing the preform 10 against the blow molding mold 51 to shape the preform 10 into the shape of the hollow container 1) is introduced into the preform 10 disposed in the blow molding mold 51 in a state where the stretching rod 52 is not in contact with the bottom portion 15 of the preform 10, thereby slightly stretching the preform 10 in the longitudinal axis direction and the transversal axis direction. That is, in the first step, the preform 10 is slightly inflated by introducing low pressure blow air into the preform 10 ((a) of FIG. 5). As a result, it is possible to prevent puncture or rupture of the bottom part 15 of the preform 10 even if a thin (small diameter) stretching rod is used as in blow molding of a small mouth container.

Here, although it is sufficient if the set pressure Pa in the first step is set lower than at least a pressure of the blow air to be introduced in the third step described below, it is preferable to set the set pressure Pa as low as possible (for example, 0.5 MPa or less). That is, it is preferable that the pressure of the blow air introduced in the first step is as low as possible but enough to inflate the preform 10. Further, it is preferable that a flow velocity of the blow air (preliminary blow air) in the first step is set lower than a flow velocity of the blow air (final blow air) in the third step described below.

Also, in the first step, it is sufficient if the preform 10 is slightly inflated, and a size of the preform 10 after inflation is not particularly limited. For example, it is sufficient if the preform 10 is inflated to such an extent that the body portion 14 of the preform 10 does not come into contact with the inner surface of the blow molding mold 51.

Next, the second step is performed. In the second step, blow air having a pressure lower than the set pressure Pa is introduced into the preform 10 like the first step, and the stretching rod 52 is moved (lowered) at a predetermined set speed Va. As a result, the preform 10 arranged in the blow molding mold 51 is stretched in the radial direction by low pressure blow air and also stretched in the longitudinal axis direction by the stretching rod 52, thereby inflating the preform 10 to a size bringing it into contact with the inner surface of the blow molding mold 51 ((b) of FIG. 5).

The set speed Va in the second step is preferably set at a speed as slow as possible such that the stretching rod 52 can follow inflation of the preform 10 by the blow air. That is, in the second step, it is preferable that the set speed Va is set as slow as possible to such an extent that the stretching rod 52 can press the bottom portion 15 of the preform 10.

Also, although the pressure of the blow air in the second step is preferably set lower than the set pressure Pa, it is not necessarily for the pressure to be set lower than the set pressure Pa. The pressure of the blow air in the second step may be properly determined to such an extent that the preform 10 is not ruptured or the like. Specifically, it is sufficient if the pressure is lower than the pressure of the blow air (final blow air) in the third step, which is the next step.

Next, the third step is performed. In the third step, blow air (final blow air) having a pressure higher than the set pressure Pa is introduced into the preform 10, which has been inflated in the second step, thereby further stretching the preform 10. That is, in the third step, the preform 10 is brought into close contact with the inner surface of the blow molding mold 51 by introducing high pressure blow air into the preform 10. As a result, the hollow container 1 having a predetermined appearance is formed ((c) of FIG. 5).

Then, the hollow container 1 is released from the blow molding mold 51, is conveyed from the stretch blow molding part 50 to the take-out part 60, and is taken out of the apparatus through the take-out part 60.

As described above, according to the present embodiment, the stretch blow molding step of stretch-blow-molding the preform 10 to form the hollow container 1 includes; a first step of stretching the preform 10 by low pressure blow air (preliminary blow air); a second step of stretching the preform 10 by low pressure blow air having a pressure, which is equal to or higher than that in the first step and lower than that in a third step (described below), and by pressing the preform 10 using the stretching rod 52; and a third step of stretching the preform by high pressure blow air (final blow air). As a result, it is possible to satisfactorily form the hollow container (resin molded product) 1 made of polyethylene (PE). For example, even if the hollow container 1 is made of high-density polyethylene, the hollow container 1 can be satisfactorily formed.

Also, by stretching the preform 10 through the stretch blow molding step including the first to third steps, it is possible to satisfactorily form the hollow container 1 without causing puncture or rupture even if polyethylene (including high-density polyethylene) which is a relatively soft resin material is employed. Further, it is possible to make a thickness of the hollow container 1 uniform or to make a surface of the hollow container 1 good.

Further, according to the present embodiment, a thickness t1 of the bottom portion 15 of the preform 10 formed by injection molding is set to be ¼ or less of a thickness t2 of the body portion 14. Accordingly, the bottom portion 15 of the preform 10 is more likely to be hardened than the body portion 14 (the temperature is easily decreased). That is, in the stretch blow molding part 50, a ratio of a skin layer in the bottom portion 15 of the preform 10 becomes higher than that in the body portion 14. Therefore, it is possible to more reliably prevent puncture or rupture from occurring in the bottom portion 15 of the preform 10 due to contact of the stretching rod 52 therewith while the stretch blow molding step is performed.

Further, according to the present embodiment, the preform 10 is released from the injection molding part 30 in a high temperature state where a surface temperature of the body portion 14 after the releasing becomes high in a short time; for example, in a high temperature state where the preform 10 has such a high residual heat that a temperature of the skin layer of the body portion 14 becomes 10° C. lower than a temperature of the melting point of the resin material within 10 seconds after the releasing. Then, the preform 10 formed by injection molding is temperature-adjusted and conveyed. Accordingly, it is possible to equalize the temperature and eliminate a variation in temperature of the preform 10 brought into the stretch blow molding part 50. As a result, it is possible to achieve a uniform distribution in thickness of the hollow container 1 formed by stretch-blow-molding the preform 10.

Here, the first conveying step, the temperature adjustment step, and the second conveying step as described in the foregoing embodiment may be performed according to another aspect (hereinafter, a modified aspect) as described below. FIG. 6 is a schematic view showing the modified aspect of the first conveying step, the temperature adjustment step, and the second conveying step. In the modified aspect, (a) of FIG. 6 shows the first conveying step, (b) and (c) of FIG. 6 shows the temperature adjustment step, and (d) of FIG. 6 shows the second conveying step. A temperature adjustment part and a temperature adjustment mold in the modified aspect will be referred to as a temperature adjustment part 140 and a temperature adjustment mold 141, respectively, in order to distinguish them from the foregoing embodiment, and the other members will be described using the same reference numerals.

In the first conveying step according to the modified aspect, the injection-molded preform 10 is released from the injection molding mold 31 and conveyed to the temperature adjustment part 140. In the second conveying step according to the modified aspect, the preform 10 whose temperature has been adjusted in the temperature adjustment step is conveyed to the blow molding mold 51. At this time, for reasons similar to those described in the forgoing embodiment, it is preferable that shrinkage phenomenon of the preform 10 is almost ended in the temperature adjustment step, and the preform 10 which hardly shrinks is conveyed to the blow molding mold 51.

The temperature adjustment step according to the modified aspect includes a heating step of heating the preform 10 in the temperature adjustment mold 141 immediately after moving the preform 10 from the injection molding mold 31 to the temperature adjustment part 140. Specifically, a temperature adjustment rod of the temperature adjustment mold 141 is inserted into an inner portion of the preform 10, and the preform 10 is received in a heating pot of the temperature adjustment mold 141, thereby reheating inner and outer skin layers of the preform 10 ((b) of FIG. 6).

After the heating step, the preform 10 is released from the temperature adjustment mold 141, and then the preform 10 is shrunk in the longitudinal axis direction in the temperature adjustment part 140, thereby performing a temperature equalization treatment. During the temperature equalization treatment, the preform 10 is deformed in a direction intersecting the longitudinal axis direction of the preform 10 ((c) of FIG. 6). The preform 10 follows a procedure, in which the preform is bent and deformed (deformation from (b) of FIG. 6 to (c) of FIG. 6) and then as the bending and deforming is relieved (reduced or ended), the preform returns to a state where there is substantially no bending (deformation from to (c) of FIG. 6 to (d) of FIG. 6). That is, the temperature adjustment step according to the modified aspect includes; a first step of shrinking the preform 10 in the longitudinal axis direction while bending and deforming the preform (deforming accompanied by horizontal swaying); and a second step of shrinking the preform 10 in the longitudinal axis direction while relieving (reducing or ending) the bending and deforming of the preform 10.

In a case of a 3-station type one-step molding machine, the temperature adjustment step is not performed. Accordingly, it is not possible to spend a period of time to equalize the temperature of the preform 10 before blow molding, or it is necessary to spend a period of time in the blow molding part before blow molding, thereby reducing a period of time required for blowing. According to the manufacturing method for manufacturing the resin container including the temperature adjustment step as described above, the preform 10 is bent and deformed due to a variation in temperature of the preform 10 (residual heat being asymmetrically present along a circumferential direction) resulting from injection molding. During bending deformation, heat in a core layer of the preform 10 is transferred to a skin layer thereof, thereby achieving temperature equalization. Accordingly, the bending deformation is relieved and thus bending is substantially eliminated. Before the stretch blow molding step, a period of time required to deform the preform 10 and equalize the temperature thereof is secured in the temperature adjustment step. Accordingly, the preform 10 can be stretched in a state suitable for the stretch blow molding step. In addition, when shaping a preform using HDPE, temperature equalization accompanied by the deformation described above progresses favorably.

The heating step in the temperature adjustment step described above is not an essential step. However, by reheating the inner and outer skin layers of the preform 10 through the heating step, it is possible to facilitate shrinkage of the preform 10 accompanied by bending deformation and thus to appropriately perform temperature equalization. Therefore, it is preferable to include the heating step. In addition, an amount of shrinkage of the preform 10 in the modified aspect may be the same as that described in the foregoing embodiment.

Although embodiments of the present invention have been described above, the present invention is not limited to the above-described embodiment, and thus appropriate changes, modifications, and the like may be freely made thereto. In addition, the material, shape, dimension, numerical value, form, number, arrangement location, and the like of each component of the above-described embodiment are arbitrary and not limited, as long as the present invention can be achieved.

For example, in the above-described embodiment, the low pressure blow air is supplied into the preform in a state where the stretching rod is inserted in the preform. Alternatively, the blow air may be supplied in a state where the stretching rod is pulled out.

Hereinafter, the above-described embodiment and the modified aspects thereof are listed.

[1]

A manufacturing method for manufacturing a resin container made of polyethylene using an injection stretch blow molding method, the manufacturing method comprising:

an injection molding step of forming a bottomed preform by injection molding; and a stretch blow molding step of stretching the preform by pressing a bottom portion of the preform using a stretching rod while introducing blow air into the preform, wherein the stretch blow molding step comprises:

a first step of stretching the preform by introducing preliminary blow air which has a pressure lower than final blow air into the preform in a state of the stretching rod is not in contact with the bottom portion of the preform;

a second step of stretching the preform by moving the stretching rod at a predetermined set speed and pressing the bottom portion of the preform by the stretching rod while introducing the preliminary blow air into the preform, the second step being performed after the first step; and a third step of stretching the preform by introducing the final blow air into the preform, the third step being performed after the second step.

[2]

The manufacturing method for manufacturing a resin container according to [1], wherein, in the injection molding step, the preform is injection-molded such that a thickness of the bottom portion of the preform is ¼ or less of a thickness of a body portion of the preform.

[3]

The manufacturing method for manufacturing a resin container according to [1] or [2], wherein the injection molding step comprises:

a filling step of filling a molten resin material into an injection molding mold having a space defining an outer shape of the preform; and a cooling step of cooling the resin material inside the injection molding mold, the cooling step being performed after the filling step, wherein a duration of the cooling step is ⅖ or less of a duration of the filling step.

[4]

The manufacturing method for manufacturing a resin container according to any one of [1] to [3], further comprising:

a temperature adjustment step of adjusting a temperature of the preform between the injection molding step and the stretch blow molding step.

[5]

The manufacturing method for manufacturing a resin container according to [4], further comprising:

a first conveying step of conveying the preform from the injection molding step to the temperature adjustment step; and a second conveying step of conveying the preform from the temperature adjustment step to the stretching blow molding step, wherein during the first conveying step, the temperature adjustment step and the second conveying step, a temperature equalization treatment is performed by considerably shrinking the preform in a longitudinal axis direction.

[6]

The manufacturing method for manufacturing a resin container according to any one of [1] to [5], wherein polyethylene having a melt flow rate of 0.3 to 1.0 g/10 min is employed as a material of the preform.

[7]

A manufacturing method for manufacturing a resin container made of polyethylene using an injection stretch blow molding method, the manufacturing method comprising:

an injection molding step of forming a bottomed preform by injection molding;

a temperature adjustment step of adjusting a temperature of the preform; and a stretch blow molding step of stretching the preform by pressing a bottom portion of the preform using a stretching rod while introducing blow air into the preform, wherein during the temperature adjustment step, a temperature equalization treatment is performed by shrinking the preform in a longitudinal axis direction thereof, wherein during the temperature equalization treatment, the preform is deformed in a direction intersecting the longitudinal axis direction.

[8]

The manufacturing method for manufacturing a resin container according to [7], wherein the temperature adjustment step comprises:

a first step of shrinking the preform in the longitudinal axis direction while bending and deforming the preform; and a second step of shrinking the preform in the longitudinal axis direction while relieving the bending and deforming of the preform.

[9]

The manufacturing method for manufacturing a resin container according to [7] or [8], wherein the temperature adjustment step comprises a heating step of heating the preform before deforming the preform.

This application is based on Japanese Patent Application No. 2019-074339 filed on Apr. 9, 2019 and Japanese Patent Application No. 2019-188812 filed on Oct. 15, 2019, the entire contents of which are incorporated herein by reference. Also, all references cited herein are incorporated in their entirety.

REFERENCE SIGNS LIST

1: Hollow container
2: Opening
3: Neck portion
4: Body portion
5: Bottom portion
10: Preform
12: Opening
13: Neck portion
14: Body portion
15: Bottom portion
20: Injection stretch blow molding apparatus
21: Machine base
22: Rotation plate
23: Neck mold
30: Injection molding part
35: Injection unit
40: Temperature adjustment part
50: Stretch blow molding part
51: Blow molding mold
52: Stretching rod
53: Blow molding split mold
54: Blow core mold
55: Blow bottom mold
56: Insertion hole
60: Take-out part

The invention claimed is:

1. A manufacturing method for manufacturing a resin container made of polyethylene using an injection stretch blow molding method, the manufacturing method comprising:

forming a bottomed preform by injection molding;

adjusting a temperature of the preform in a temperature adjustment;

stretching the preform in a stretch blow molding by pressing a bottom portion of the preform by a stretching rod while introducing blow air into the preform;

conveying the preform from the injection molding to the temperature adjustment in a first conveying; and conveying the preform from the temperature adjustment to the stretch blow molding in a second conveying, wherein the temperature adjustment includes at least processing of heating the preform from outside, wherein during the first conveying, the temperature adjustment, and the second conveying, the temperature adjustment is performed such that a length in a longitudinal axis direction of the preform at the time of being brought into the stretch blow molding is shrunk by at least 8% or more of a length in the longitudinal axis direction of the preform at the time of forming in the injection molding.

2. The manufacturing method for manufacturing a resin container according to claim 1, wherein the temperature adjustment is performed such that a length in a longitudinal axis direction of the preform at the time of being brought into the stretch blow molding is shrunk by 10% to 20% of a length in the longitudinal axis direction of the preform at the time of forming in the injection molding.

3. The manufacturing method for manufacturing a resin container according to claim 1, wherein in the injection molding, the preform is injection-molded such that a thickness of the bottom portion of the preform is ¼ or less of a thickness of a body portion of the preform.

4. The manufacturing method for manufacturing a resin container according to claim 1, wherein the injection molding comprises:

a filling of filling a molten resin material into an injection molding mold having a space defining an outer shape of the preform; and a cooling of cooling the resin material inside the injection molding mold, the cooling being performed after the filling, wherein a duration of the cooling is ⅖ or less of a duration of the filling.

5. The manufacturing method for manufacturing a resin container according to claim 1, wherein polyethylene having a melt flow rate of 0.3 to 1.0 g/10 min is employed as a material of the preform.

* * * * *